(12) United States Patent
Clark (10) Patent No.: US 11,134,315 B1
(45) Date of Patent: Sep. 28, 2021

(54) METHOD OF SELECTING A SUITABLE CONTENT FOR SUBJECTIVE PREFERENCE JUDGEMENT

(71) Applicant: Mimi Hearing Technologies GmbH, Berlin (DE)

(72) Inventor: Nicholas R. Clark, Royston (GB)

(73) Assignee: Mimi Hearing Technologies GmbH, Berlin (DE)

( * ) Notice: Subject to any disclaimer, the term of this patent is extended or adjusted under 35 U.S.C. 154(b) by 0 days.

(21) Appl. No.: 17/028,143

(22) Filed: Sep. 22, 2020

(30) Foreign Application Priority Data

Jul. 20, 2020 (EP) .................................... 20186716

(51) Int. Cl.
*H04N 21/475* (2011.01)
*G06N 20/00* (2019.01)
*H04N 21/45* (2011.01)
*H04N 21/845* (2011.01)

(52) U.S. Cl.
CPC ......... *H04N 21/4755* (2013.01); *G06N 20/00* (2019.01); *H04N 21/4532* (2013.01); *H04N 21/8456* (2013.01)

(58) Field of Classification Search
CPC ........... H04N 21/4755; H04N 21/4532; H04N 21/8456; G06N 20/00
See application file for complete search history.

(56) References Cited

U.S. PATENT DOCUMENTS

| | | | | |
|---|---|---|---|---|
| 8,706,272 | B2* | 4/2014 | Lindahl | G10L 19/20 700/94 |
| 9,712,860 | B1* | 7/2017 | Waggoner | H04L 65/4084 |
| 2002/0049974 | A1* | 4/2002 | Shnier | G06F 16/40 725/47 |
| 2006/0045281 | A1* | 3/2006 | Korneluk | A61B 5/121 381/60 |
| 2007/0067800 | A1* | 3/2007 | Wachtfogel | H04N 21/2221 725/42 |
| 2011/0013779 | A1* | 1/2011 | Arthur | H04R 29/00 381/56 |

(Continued)

FOREIGN PATENT DOCUMENTS

EP 3614380 A1 2/2020

OTHER PUBLICATIONS

Lalitha, S et al.; "Speech emotion recognition using DWT"; 2015 IEEE International Conference on Computation Intelligence and Computing Research; Dec. 10, 2015; pp. 1-4.

(Continued)

*Primary Examiner* — Fernando Alcon
(74) *Attorney, Agent, or Firm* — Polsinelli PC (57) ABSTRACT

The present disclosure relates to a method for processing media content. The method comprises receiving a definition of a user specific media corpus, the media corpus comprising a plurality of media files; ranking candidate media segments generated from the media corpus according to one or more signal characteristics derived from the candidate media segments; processing the media signals of a subset of the ranked candidate media segments with different signal processings; presenting the differently processed media signals to a user for a user preference judgement; and determining a preferred signal processing based on user responses to the presentations.

21 Claims, 7 Drawing Sheets

(56) References Cited

U.S. PATENT DOCUMENTS

| | | | |
|---|---|---|---|
| 2014/0040946 A1* | 2/2014 | Gates, III | H04N 21/2668 725/34 |
| 2014/0043543 A1* | 2/2014 | Konuma | G11B 27/28 348/738 |
| 2014/0068661 A1* | 3/2014 | Gates, III | H04N 21/441 725/34 |
| 2016/0164937 A1* | 6/2016 | Reddappagari | H04L 65/601 370/259 |
| 2017/0018272 A1* | 1/2017 | Lee | H04N 21/4532 |
| 2018/0286462 A1* | 10/2018 | Becherer | G06F 3/165 |
| 2018/0336902 A1* | 11/2018 | Cartwright | G10L 17/02 |
| 2019/0166435 A1* | 5/2019 | Crow | H04R 25/505 |
| 2019/0267026 A1* | 8/2019 | Krinsky | G10L 25/69 |
| 2020/0136580 A1* | 4/2020 | Renner | H04N 21/462 |
| 2021/0073264 A1* | 3/2021 | Vaughn | G06N 20/00 |

OTHER PUBLICATIONS

Rennies, Jan et al.; "User-Interface Concepts for Sound Personalization in Headphones"; 2016 AES International Conference on Headphone Technology; Aug. 19, 2016.

* cited by examiner

METHOD OF SELECTING A SUITABLE CONTENT FOR SUBJECTIVE PREFERENCE JUDGEMENT

The present invention relates to a method of selecting a suitable audio content for subjective preference judgement for processing strategies.

BACKGROUND

It is desired to enable users to make subjective preference judgements in order to adapt processing strategies using content that is representative of the audio that they consume.

It has been demonstrated that subjective preference ratings for signal processing strategies are heavily dependent on the specific content used. In an audio content segment, factors such as the relative proportion of high or low frequency energy play a very important role. For example, if a segment of content already has a lot of high frequency energy, then a strategy that adds additional high frequency energy may not be preferred, or at least receive a very different preference rating compared to another content segment with lower levels of high frequency energy prior to processing.

Linear processes, such as equalization (EQ), are only susceptible to certain signal statistics of the content. Non-linear processes, such as dynamic range compression, are also susceptible to certain signal statistics of the content, but are also susceptible to additional variables, i.e. the overall signal level or the temporal dynamics of the content selected, among many others. For example, if the signal energy is below the compression threshold, there will be no effect.

When tuning a processing strategy based on the preference ratings of a user, one strategy could be to present the user with random selections of content from a corpus of audio in order to capture an average preference rating that can then be used for generic application to all content types. However, this may require a large number of user responses to identify a consistent pattern of processing parameterization preference over the measurement noise.

Measurement noise in subjective preference testing is significant due to inconsistencies within the individual user responses, even when similar or identical audio test material is used for repeated measurements. This measurement noise is exacerbated when a variety of content that is presented. It is desirable to intelligently minimize the noise contribution from the content selection. Strategies such as guidance and intelligent user interface design may for example help to minimize measurement noise from the individual.

The process of manually assessing audio segment candidates is also time consuming and laborious. Further, if the criterion for the selection of content changes, the content-selection process must be repeated.

One also has to be careful not to confound short- and long-term signal statistics. A particular audio clip may overall meet the suitability criteria, but sub-clips may vary drastically from the overall criteria. For example, in a given song there may be an intro section that yields a different preference rating to the main verse. Care must be taken to select clip regions with a unified sonic character throughout, i.e. which doesn't exceed a specified variance for statistics calculated over relatively short regions compared to the clip as a whole.

When moving the subjective preference rating procedure from the laboratory to a consumer device, the issue of content licensing arises. One solution is to use a corpus of predefined audio where licensing permission is granted and the user has access to the audio, but then there is the issue that there is evidence to suggest that individuals are better able to make subjective preference ratings on content with which they are familiar.

Therefore, there is a clear need for an improved method of content selection aiming to reduce measurement noise in subjective preference judgement, in which the selection of content clips is made among content clips from content that the end user has freedom to consume.

SUMMARY

The present invention seeks to address the aforementioned problems. The features according to the invention are specified within the independent claims, advantageous implementations of which will be shown in the dependent claims. The features of the claims can be combined in any technically meaningful way, and the explanations from the following specification as well as features from the figures which show additional embodiments of the invention can be considered.

In general, the presently disclosed technology features systems and methods for processing media content aiming at reducing measurement noise in user preference judgement.

In an embodiment of the present invention, a definition of a user specific media corpus comprising a plurality of identified media files is received, e.g. from a consumer device associated with a user. A media file may be an audio clip or the audio part of a video clip. Audio content may refer to music content or to speech content. The present invention is mostly referring to music content, but may also be applicable to speech content. The definition of the user specific media corpus may be based on a user's media consumption history (e.g. a playlist), on the specification of a preferred media genre, or based on any other media specification (e.g. identifying an artist or an album).

Candidate media segments are generated from the media corpus, and one or more signal characteristics may be derived from the candidate media segments, e.g. by calculating the signal characteristics from the media signals of the candidate segments. The candidate media segments may be selected sections of the identified media files. The candidate media segments may then be ranked according to their one or more signal characteristics.

A subset of the candidate media segments may be identified, e.g. the top-N candidates according to the ranking. The media signals of the selected subset of the candidate media segments may further be processed with different signal processings. The different signal processings may be different signal processing algorithms (e.g. signal equalization, dynamic range compression, etc.) or different configurations of a same signal processing algorithm, e.g. different presets. For example, the selected media segments are each processed with different configurations of a multiband compression algorithm, resulting in a plurality of probe signals for each media segment. Typically, the probe signals for a media segment have differently sounding characteristics. Generation of candidate media segments and calculation of signal characteristics from the media signals may be performed on a server computer, or on the consumer device such as a personal computer, a tablet or a smartphone.

The differently processed media signals are presented to a user for user preference judgement, e.g. by playing the processed media signals to the user. The user can then select which probe signal for a selected media segment (and consequently which processing) he prefers over the others.

This process is typically repeated for all selected media segments. Subsequently, a preferred signal processing based on user responses to the presentations is determined, e.g. by determining which applied signal processing the user has chosen the most.

Deriving signal (or signal-statistical) characteristics from the candidate audio segments and ensuring that the audio segments used for subjective preference evaluation adhere to certain signal-statistical requirements has the advantage of ensuring that the content presented to the user may be controlled.

In one embodiment, the candidate media segments are generated by a chunking algorithm that partitions the media files into segments, the candidate media segments having a length between a minimum segment duration and a maximum segment duration. This has the advantage to automatically generate segments of an audio file having a duration that is suitable to subjective preference judgement tests.

In one embodiment, the candidate media segments are generated by a looping algorithm that identifies segments that are suitable for a repeated (looped) presentation to the user. Suitability for looped presentation may be judged by meeting a minimum loop quality criterion. This allows consideration of shorter segments for a looped user presentation, still providing the user with a sufficient listening experience to make a reliable preference judgement.

In one embodiment, an error score is generated for a candidate media segment from the derived signal characteristic of the candidate's media signal. The generation of an error score has the purpose to quantify the difference between a signal characteristic of an audio segment and the optimal signal characteristic that the audio segment could have for use in a subjective preference judgement test.

In one embodiment, the ranking is based on a weighted combination of the error score of the derived signal characteristic and the error score of a secondary signal characteristic derived from the candidate media segment. Similar, further signal characteristics may be derived and weighted combinations of their error scores used for the ranking. Using a weighted combination of error scores has the advantage to put the emphasis on one signal characteristic over one other.

In one embodiment, deriving the signal characteristic from the media signal of the candidate media segment results in an index score for the signal characteristic. An error score representing how well the index score of the candidate's media signal matches a target index score may be generated. The error score may be the difference between the index score and the target index score. The target index score may be a number that represents a preferred value of the signal characteristic, i.e. a target value for the signal characteristic of the media segment that is considered to represent a media signal having desired properties for presentation during user preference judgements.

In one embodiment, the weights for the combination of error scores and/or the target index score of the signal characteristic are determined by a machine learning algorithm. Using a machine learning algorithm has the advantage of intelligently automating the process while continuously giving further input to the algorithm and learning from the differences in measurement (error) between the past user-preference judgements, therefore continuously reducing noise in further subjective preference measurements.

In one embodiment, the processed media signals of the subset of candidate media segments are presented at least twice to the user and an error term is generated representing how consistent the user's preference judgements are. The error term may be used as an optimization criterion for the machine learning algorithm.

In one embodiment, the signal characteristic comprises one of: a spectral centroid, a loop quality index, a spectral flux, and a zero-crossing rate of a candidate media segment. These signal characteristics have the advantage to define signal properties of audio segments, without the assessment of a human ear. For example, these signal characteristics may allow to automatically measure sound qualities of audio segments, such as its timbre, brightness, tone colour or quality, to classify percussive sounds, onset detection, or to determine how well (i.e. natural- and seamless-sounding) a segment would sound when continuously played in a loop, so as not to distract the attention of the user and thus not form another potential source of noise in the judgement ratings.

In one embodiment, the subset of the candidate media segments is determined from the best-ranked candidate media segments, in particular by selecting the top N candidates or by applying a threshold value. This has the advantage of obtaining one or more top candidates that may be the best fit in a subjective preference judgement test.

In one embodiment, the definition of a user specific media corpus refers to a content database on a media server or on the consumer device associated with the user.

In one embodiment, the media files are audio clips in a music library stored on a media server or on the consumer device associated with the user.

In one embodiment, the definition of a user specific media corpus comprises a playlist received from the consumer device associated with the user.

In one embodiment, the definition of a user specific media corpus comprises identification of a genre, the method further comprising identification of the media corpus comprising a plurality of media files meeting that genre. This has the advantage to have the user subjected to a musical genre he is familiar with and/or he appreciates, which may be considered as being favourable in the frame of subjective preference tests.

In one embodiment, processing the media signal of a subset of the media file segments comprises processing the segments with different signal processing algorithms or different configurations of a same signal processing algorithm. The proposed approach is applicable to a wide area of signal processings that cause modifications of sounding characteristics for the processed media signals that can be perceived by the user. It allows to determine which signal processing a user prefers for media playback.

In one embodiment, presenting the differently processed media signals to a user comprises playing the differently processed media signals and prompting the user to provide a user preference judgement. A graphical user interface on a computer device may be employed to allow the user to control the playback and comfortably make preference judgements. The computer device may be a consumer device such as a personal computer, a tablet or a smartphone having a user interface. The consumer device may receive the processed media signals from server computer, or may perform the respective signal processings based on instructions received from the server computer.

In one embodiment, determining a preferred signal processing based on user responses to the presentations comprises determining a preference score for the applied different signal processings based on the user's preference judgements for each presented differently processed media signal for the subset of media file segments. For example, each time the user selects a processed media signal in the preference judgement over the same media signal differently processed, the corresponding signal processing receives a preference score increase. Eventually, the signal processing having the largest preference score is selected as preferred signal processing.

In one embodiment, determining a preferred signal processing based on user responses to the presentations comprises determining preferred configuration parameters of an applied signal processing algorithm, e.g. by identifying the configuration parameters corresponding to the processed media segments selected the most liked by the user. The determining a preferred signal processing may be performed on a server computer or on a consumer device associated with the user.

In one embodiment, an identification of the preferred signal processing is communicated from a server computer to a consumer device associated with the user for application to media content. Thus, the identified preferred signal processing for the user can be applied for future playback of media files.

The presently disclosed technology further features an apparatus comprising a processor and a memory for storing instructions for the processor, the instructions, when executed by the processor, for performing the method as described above.

While some example embodiments will be described herein with particular reference to the above application, it will be appreciated that the present disclosure is not limited to such a field of use, and is applicable in broader contexts.

Notably, it is understood that methods according to the present disclosure relate to methods of operating the apparatuses according to the above example embodiments and variations thereof, and that respective statements made with regard to the apparatuses likewise apply to the corresponding methods, and vice versa, such that similar description may be omitted for the sake of conciseness. In addition, the above aspects may be combined in many ways, even if not explicitly disclosed. The skilled person will understand that these combinations of aspects and features/steps are possible unless it creates a contradiction which is explicitly excluded.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors, such as graphics processing unit (GPU) processors.

Other and further example embodiments of the present disclosure will become apparent during the course of the following discussion and by reference to the accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understand that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Reference to 'one embodiment' or 'an embodiment' means that a particular feature, structure, or characteristic described in connection with the embodiment is included in at least one embodiment of the disclosure. The appearances of the phrase 'in one embodiment' in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1A:
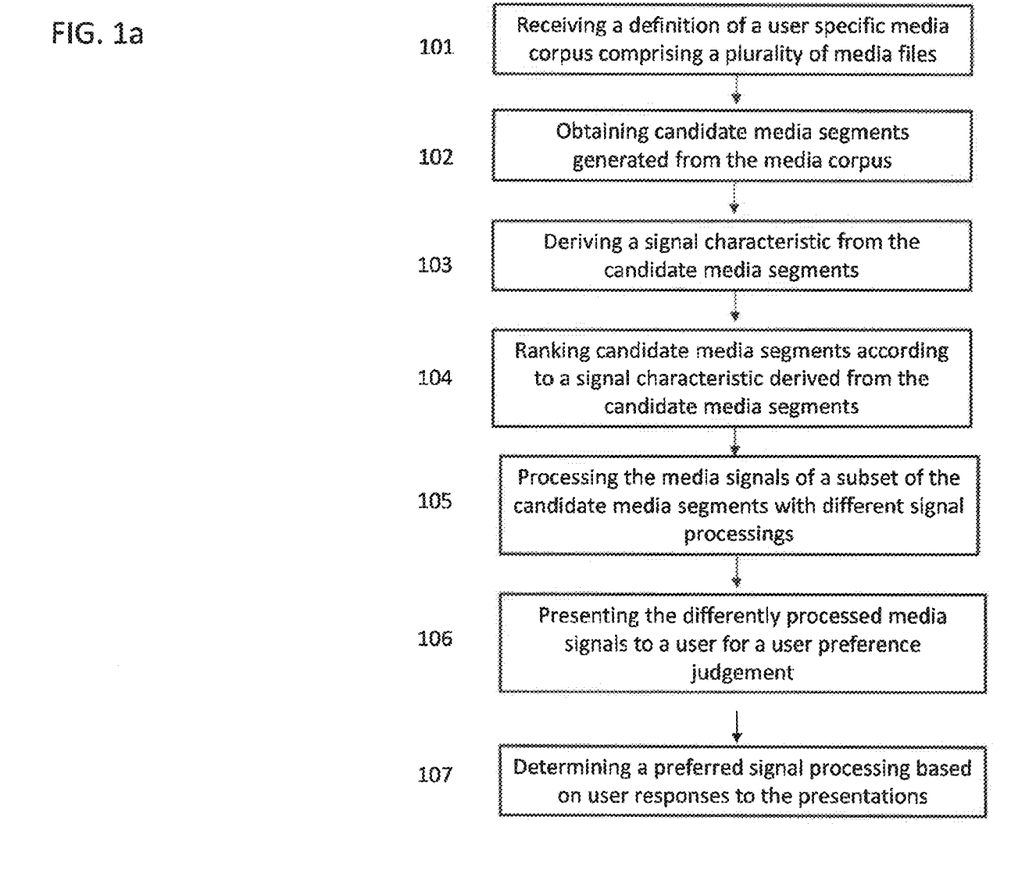
FIGS. 1a and 1b are flow diagrams exemplifying a method carried out in accordance with an embodiment of the present invention.

FIG. 1a is a flow diagram illustrating a non-limiting example of a method carried out in accordance with an embodiment of the present invention.

In a first step 101, a definition of a user specific media corpus comprising a plurality of media files is received. In other words, candidate audio segments are extracted from a content library. The candidate audio segments will further be used for a user preference judgement test, and they are selected such as to reduce the measurement noise in said user preference judgement tests. The audio content library may be local or remote. The audio content library comprises one or more digitally encoded audio files.

In one scenario, the audio file coming from the audio content library is already recognised and is ready to be used as a candidate segment for further user preference response testing. There is readily available data about the audio file (e.g. a signal characteristic derived from the audio signal) which may be recognized from metadata tags or audio fingerprinting (the process of digitally condensing an audio signal, generated by extracting acoustic relevant characteristics of a piece of audio content). It may for example be the case that characteristic features about the audio file have been extracted before. If the features correspond to the latest version of the selection algorithm for appropriate candidate segments, the audio file may enter the candidate segment database and is ready to be subjected to user preference response. The selection algorithm may evolve over time, so if the extracted features do not match the current parameters of the selection algorithm anymore, the feature extraction process should happen again (at least for the outdated portions).

In a second scenario, candidate segments having a length comprised between a minimum segment duration and a maximum segment duration are generated in step 102 from the audio files coming from the audio content library. Candidate segments may be generated by a chunking or segmenting algorithm that partitions the media files into segments. This may be done in a more or less complex way, the trade-off of more complexity in the chunking of the audio file being computational power. The more computational power is dedicated to chunking the audio file, the higher the chances are that the audio segment obtained from the audio file is suitable to be used further in the process. An example of a minimum segment duration may be 5 seconds. An example of a maximum segment duration may be 15 seconds.

In a simple chunking algorithm, audio waveform segments may be created for the minimum segment (or loop) duration. There may be an overlap between the segments, in order to increase the number of generated segments. For example, an overlap of 25% with the prior segment may generate four times the number of segments that would be generated without an overlap. Providing a larger number of segments results in a higher likelihood of generating useful segments.

The segment size (i.e. the duration of the candidate segment) may be incremented, either by a fixed amount (e.g. 1 second), or by a percentage (e.g. 25%), to produce more segments. This process may be repeated until the maximum segment duration size is reached.

In a more complex looping algorithm, a minimum loop quality criterion L may be set, and the segments meeting the loop quality criterion L and comprised between the minimum and the maximum duration may be selected by the selection algorithm.

A loop of audio is a segment of audio that can be played repeatedly such that the transition from the end of the segment back to the beginning of the segment sounds natural and seamless. Continuously playing a loop shall sound like a continuous piece of audio. The looping algorithm automatically find segments of audio that sound natural and seamless when played continuously. In other words, the end of a given loop needs to seamlessly transition back to the beginning of the loop. The algorithm finds similar chunks of audio for each chunk of audio in a file. An example of a looping algorithm is disclosed in "LoopMaker: Automatic Creation of Music Loops from Pre-recorded Music", Shi and Mysore, ACM (Association For Computing Machinery, 2018, which is incorporated by reference. The algorithm calculates as a loop quality criterion L a similarity between chunks in terms of harmony, timbre, and energy. Pairs of chunks having the best loop quality criterion L are then selected as candidates for audio loops.

In step 102, one or multiple algorithms may be used. The algorithms may be used alone or in combination to generate candidate segments.

A list of candidate segments is obtained by step 102.

The subsequent step 103 consists in a feature extraction step, in which one or more features or signal characteristics are extracted or derived from the candidate media segments.

The feature extraction step 103 is a step in which the candidate segments are analyzed to determine if they comply to certain criteria making them more suitable for the user preference test step and the reduction of measurement noise during this step.

Examples of signal characteristics or features that may be extracted may be, but are not limited to, spectral centroid, loop quality index, spectral flux, and zero crossing rate. In order to quantify the signal characteristics or features, and to further use them to rank the candidate segments, an index score is used. A target index score may also be identified, in order to define optimal values of the index score for a specific signal characteristic.

Spectral centroid is a feature used to characterize an energy spectrum in digital signal processing. Spectral centroid reflects the center of mass of the spectral energy, and perceptually has a robust relationship with the "brightness" of a sound, therefore may give indications about the timbre and perceived sound quality of a segment.

Spectral centroid is calculated as the weighted mean of the frequencies present in the signal, determined using a Fourier transform with their magnitudes as the weights:

$$\text{Centroid} = \frac{\sum_{n=0}^{N-1} f(n)x(n)}{\sum_{n=0}^{N-1} x(n)}$$

where x(n) represents the weighted frequency value, or magnitude, of bin number n, and f(n) represents the center frequency of that bin. The spectral centroid is a frequency and may be quantified in Hertz (Hz).

To determine if the spectral centroid value is suitable, and for ranking purposes, the spectral centroid may be visualized on a logarithmic scale. The spectral centroid value in hertz (Hz) may be matched to a ranking score. If the spectral centroid is comprised between 0.1 and 10 kHz, 0.1 kHz corresponds to an index score of 0, and 10 kHz corresponds to an index score of 1. So, for example, 1 kHz centroid would be a score of 0.5 as it is logarithmically 50% between the 2 values (1000=10×0.1, and 10000=10×1000). If the centroid is below 0.1 or above 10 kHz, then the score is set to respectively 0 (centroid below 0.1, kHz) or 1 (centroid above 10 kHz) respectively. An optimal target index score for the spectral centroid may for example be 0.3.

Loop quality index corresponds to a minimum loop quality criterion L. Minimum and maximum values of L may be set. The loop quality criterion L may correspond to a similarity between two segments. It may be calculated by computing the distance between two chunks that start with a similar beat, and by taking the inverse of that distance. A high similarity between segments is equivalent to good looping properties. The similarity may be converted into an error score:

Loop quality index error score=1−L

In addition to the loop quality index L, the duration of the segments may be considered.

Spectral flux is a criterion that may be used to determine spectro-temporal variability. It is a measure of how quickly the power spectrum of a signal is changing, calculated by comparing the power spectrum for one frame against the power spectrum from the previous frame. In other words, it is usually calculated as the 2-norm (also known as the Euclidian distance) between the two normalized spectra.

For example, a power spectrum, or ⅓ octave band power analysis may be computed for frames of 500 ms overlapping at a rate of 50%, by calculating the mean Euclidian distance between each frame, and then taking the mean of these values of mean Euclidian distance across all the frames. This allows to obtain an estimation of variations of the spectrum over the specified time frames. It may also be desirable to calculate a few flux measures at different time bases, e.g. 2 second time frames. If the long-term time base is a relatively small number, then it means that the energy is not varying massively over the long term, which might be useful for judgement. But if the short-term time base calculation also has a low average spectral flux, then the music may be too monotonous to use for a meaningful preference rating. The target flux index may be expressed in mean dB/second.

The Zero crossing rate (ZCR) is the rate of sign-changes along a signal, i.e., the rate at which the signal changes from positive to zero to negative or from negative to zero to positive. This feature may be used in speech recognition and music information retrieval, because it allows to classify percussive sounds. A lower bound and an upper bound may be set for the Zero crossing rate value. An index score comprised between 0 and 1 may be calculated, based on the interpolation of the ZCR values between the lower and upper bound values.

The ZCR is formally defined as $$zcr = \frac{1}{T-1}\sum_{t=1}^{T-1} 1_{\mathbb{R}_{<0}}(s_t s_{t-1})$$

for a signal s of length T.

These features for each candidate audio segment may be stored in a database. Tags may be used to identify the original audio file they are derived from, as well as other metadata, such as the start and end time of the segment in the original audio file. The database may be generated locally for the individual user on the user's device or be located in the cloud as a shared resource across users.

The next step 104 consists in the ranking of the candidate audio segments for suitability in user preference judgement tests. Different options may be applicable to obtain a ranking of the available candidate audio segments.

One option consists of a ranking with fixed parameters. To obtain a fixed ranking of candidate segments to be used in user response judgements, each candidate segment should have an associated error score for their suitability for presenting to a user for subjective preference judgement, according to which the segments will be sorted. For each feature, there is an error score that may be summed to obtain a final error score for a candidate segment. The index scores obtained in the feature extraction step may be turned into an error score as is described below.

For certain features, scores are not necessarily worse if they are higher or lower. In the case of spectral centroid, it may be decided that an index score of 0.3 is optimal. Therefore, an error score between zero and one may be generated by taking the square root of the absolute difference between the centroid index score and a target index score. This method may also be applicable to spectral flux and zero crossing rate. The Loop quality index feature is already an error, but where a high number is good and a low number is bad, so in this case the error corresponds to: error score=1−Loop quality index, as explained above.

Having an array of error scores for each candidate segment and each feature, an array of weights comprised between zero and one may be assigned to the respective error scores of features, corresponding to the importance of the respective features.

For example, spectral centroid may be critical, so a weight of 1.0 may be assigned, whereas ZCR might be less influential in the desired outcome of getting consistent user responses, so a weight of 0.3 may be assigned. The error scores are then multiplied by the error weights for each feature respectively. The total is summed to give the final error score, and a ranking is obtained by listing the candidate segments from low to high based on calculation. As mentioned above, the ranking may be based on fixed parameters such as target index scores and weights.

Another ranking option consists of a dynamic ranking (e.g. applying a neural network for determining ranking parameters), such as a ranking based on machine learning. The advantages of such a ranking method is that an optimum index score may be calculated for each feature. Another advantage provided by such a ranking method is that it may indicate the relative weight of the features in the final ranking.

A dynamic ranking system may start from initial set of index scores for the different features, and the candidate segments may be ranked randomly or manually according to a fixed ranking method as described above. For example, the initial target scores may be set manually as explained above and the initial feature weights may be set randomly. The machine learning algorithm may then automatically determine revised target scores and weights by optimizing an error term as explained below.

In a further step 105, a subset of the candidate segments is processed with different signal processings. The different signal processings may comprise different signal processing algorithms, or different configurations of a same algorithm with different presets. The subset of the candidate segments is obtained by taking the N top candidate segments of the ranking obtained in the previous step. The signal processings may comprise typical compression parameters, such as the compression threshold and the compression ratio.

In a further step 106, the differently processed media signals may be presented to a user for a user preference judgement. A set of user responses is then generated by presenting the candidate segments to user response judgement. This typically takes place on a user interface, allowing to interact with the user. Such an interface may allow to the user to indicate his preference for certain audio processing presets rather than other, for example by being able to compare them. Examples of user interface comparison methods may include, but are not limited to, a grid, MUSHRA testing, "A/B" testing methods in which the user may rank in order of preference, user comparison. Variables such as coloration or compression of the audio content may be used as variables, for example variables displayed on axes of a grid.

This step may be repeated for a certain number of times, preferably at least two times.

In a step 107, a preferred signal processing is determined based on the user responses to the presentations. An error term may be calculated to determine the measurement noise in the judgement tests. It may be used to train the dynamic ranking system. The error term is based on how consistent the user is at making preference judgements. The dynamic ranking system may correlate this variability with the content features in order to select the content that minimizes the user response variability.

The user response variability may be determined in different ways.

For example, it may be determined by playing the same candidate segment repeatedly, on a user preference interface that may be different. Presenting different types of user interface to the user has the advantage of varying the visual space for the user focusing on his preference, and not just reproducing the previous judgement by visualization only.

The user response variability may further be determined by playing many different candidate segments and discovering similarities in features between candidate segments. From this information the variations between the user response across these similar candidate segments may be analysed.

Another way to determine user variability is to calculate it using any audio digital signal processing modification which has parameters by simply taking the Euclidean distance of the chosen parameter set from the mean of the parameters obtained previously. For example, by taking the parameters in a multidimensional space, it is possible to measure the Euclidian distance between the processing parameters obtained in one specific user response (e.g. the last user preference response that has been received) and the mean coordinates of the processing parameters obtained in previous user preference responses. This Euclidian distance may be used as an optimisation criterium for machine learning.

The user responses may be collected on the device and sent to a server, which may calculate the user response variability. Alternatively, the user responses response variability may be calculated directly on the user device using the user responses, and the user response variability may then be sent to the server.

The response error may then be used to train an unsupervised neural network to weight and value the feature index scores to minimise the user response variability. This can either be done as a local process on the client side, or as one neural network acting on a database of responses from multiple users to train it faster on the optimum feature index scores and relative weights.

Figure 1B:
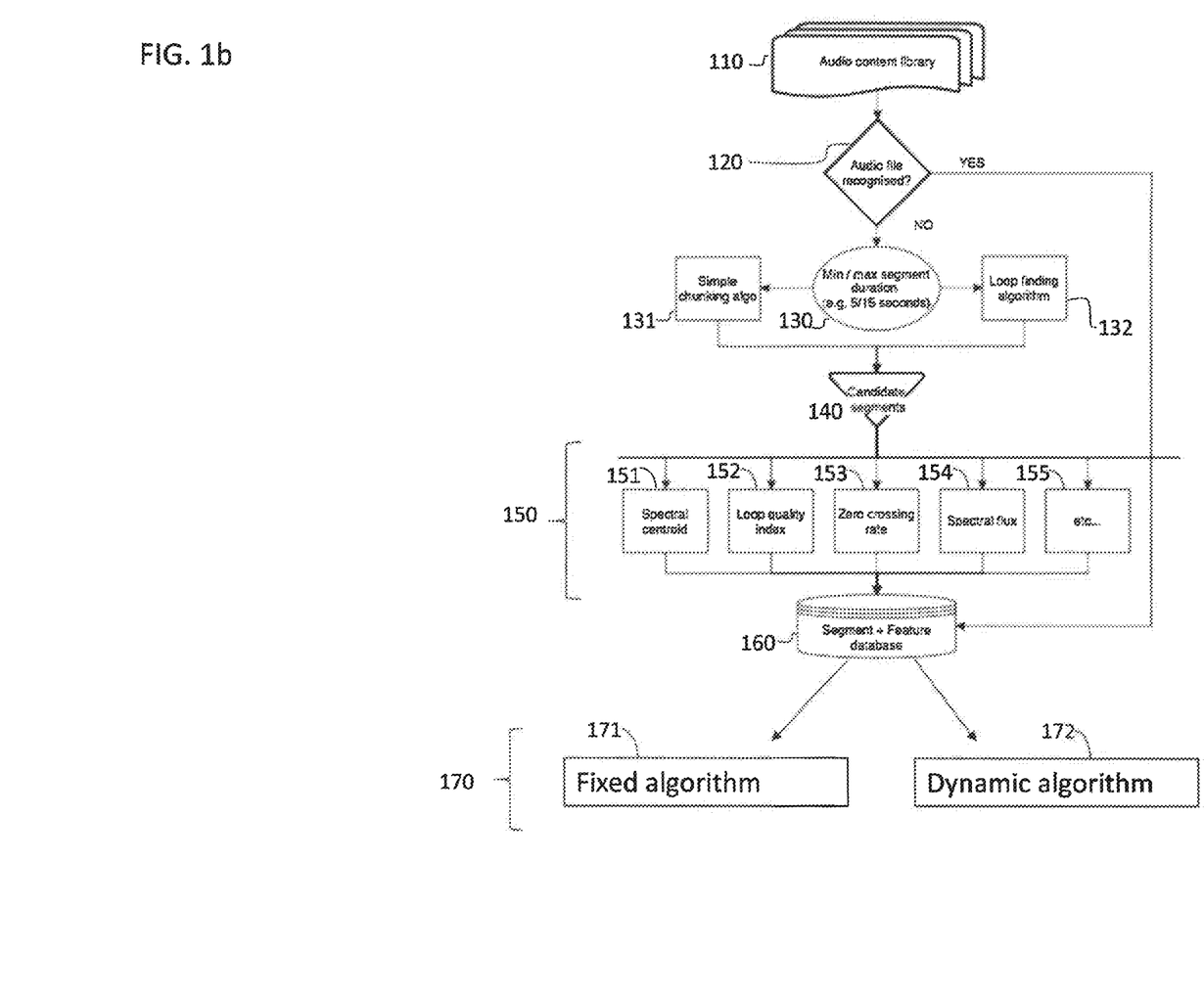

FIG. 1b is a flow diagram illustrating an alternative embodiment of the content selection method.

An audio content library 110 comprises one or more digitally encoded audio files.

In step 120, one of the audio files is either recognised or not. If the audio file is recognised, it may directly be used for user preference judgement and enter the segment database 160. If the audio file is not recognized, it is split in segments having a duration comprised between a minimum and a maximum duration in step 130. The segmentation of the audio file may take place using a simple chunking algorithm 131, and/or a loop finding algorithm 132. Subsequent to this step, candidate segments 140 are obtained.

The next step 150 consists in the extraction of one or more features or signal characteristics. The features that may be extracted from the candidate segments may be the spectral centroid 151, the loop quality index 152, the Zero crossing rate 153, the spectral flux 154, or further features 155.

The candidate segments are then associated to their respective features in the database 160 storing the candidate segments and their respective features. The database 160 may be stored on a server.

The candidate segments stored on the database 160 are then ready to be ranked in the following ranking step 170. The candidate segments may be ranked using a fixed algorithm 171. The ranking may be fine-tuned over time using a dynamic algorithm 172.

In a fixed ranking 171 of candidate segments to be used in user response judgements, each candidate segment should have an associated error score for their suitability for presenting to a user for subjective preference judgement, according to which the segments will be sorted. For each feature, there is an error score that may be summed to obtain a final error score for a candidate segment, as described in the description of FIG. 1a.

Once a fixed ranking 171 of candidate segments is obtained, the candidate segments may be presented to user preference judgement tests. User preference responses may be collected, and an error in user preference response may be calculated. An error minimization algorithm may train the dynamic ranking algorithm 172 by calculating new error weights to be used to rank the candidate segments. This process of ranking 170 may be repeated in the purpose of reduction of the measurement noise.

Figure 2:
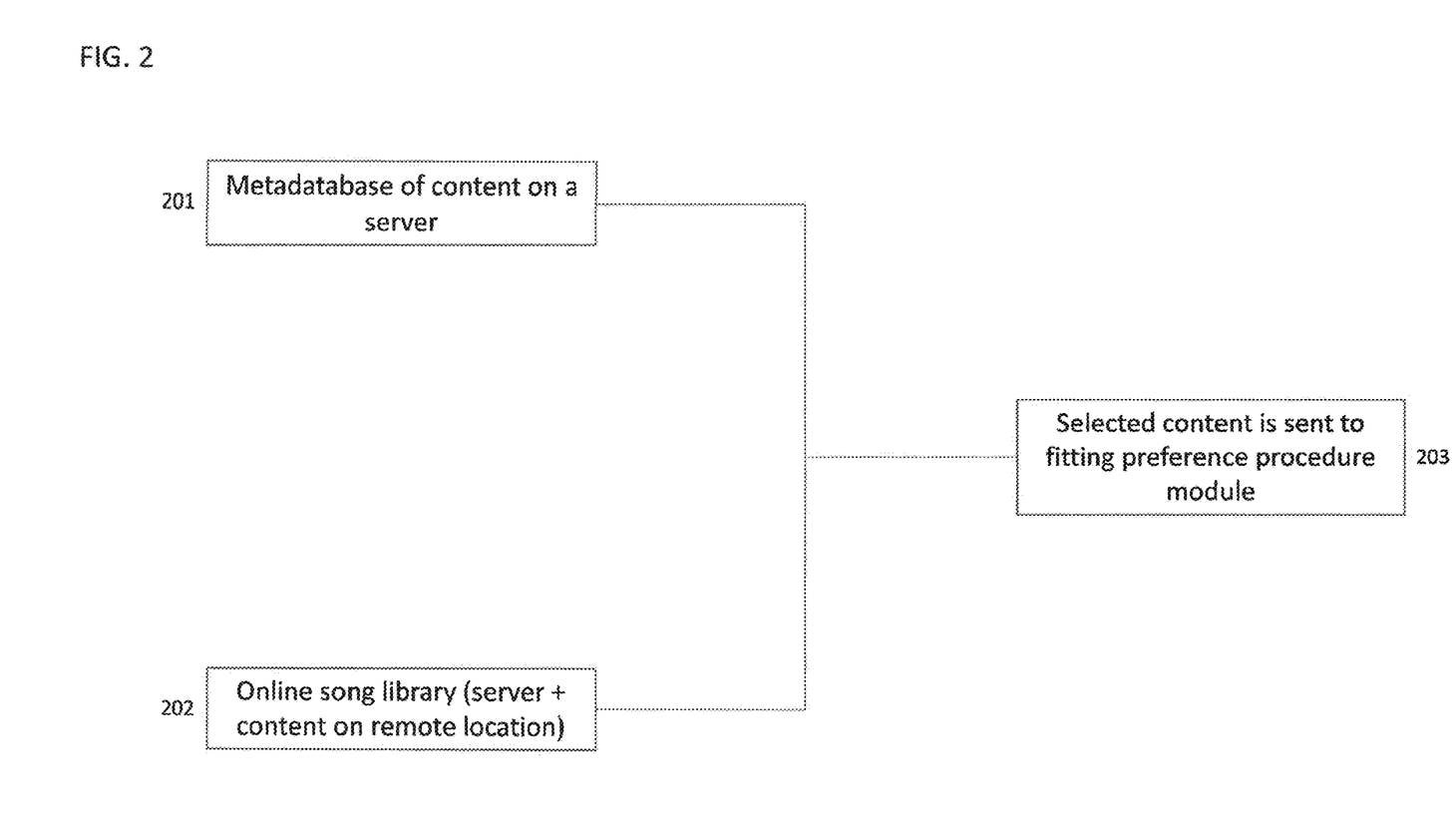
FIG. 2 is a flow diagram illustrating different origins the content submitted to the content selection procedure may have.

FIG. 2 is a flow diagram illustrating different origins that the content submitted to the content selection procedure may have.

One origin of content submitted to the content selection procedure may be a metadatabase 201 of content on a server.

A further origin of content submitted to the content selection procedure may be content 202 from an online song library (server and content on remote location).

Figure 5:
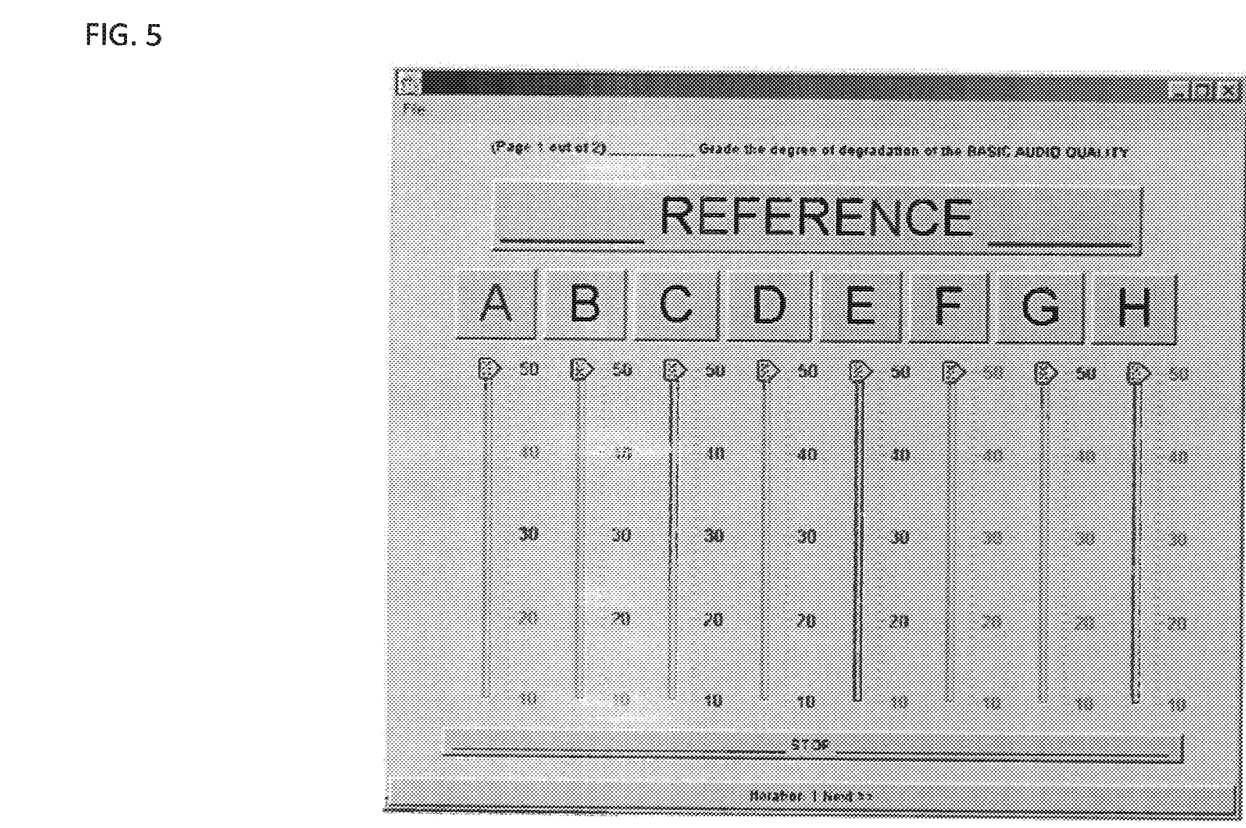
FIG. 5 illustrates a MUSHRA testing procedure.

The selected content is then sent to fitting preference procedure module 203. The fitting preference module 203 comprises a module which may determine the preferences of a user and match these preferences to a set of processing parameters. The fitting preference module 203 may comprise a user interface to allow the user controlling the playback of processed media files and to receive user feedback in the form of preference judgements. An example user interface is shown in FIG. 5.

Figure 3:
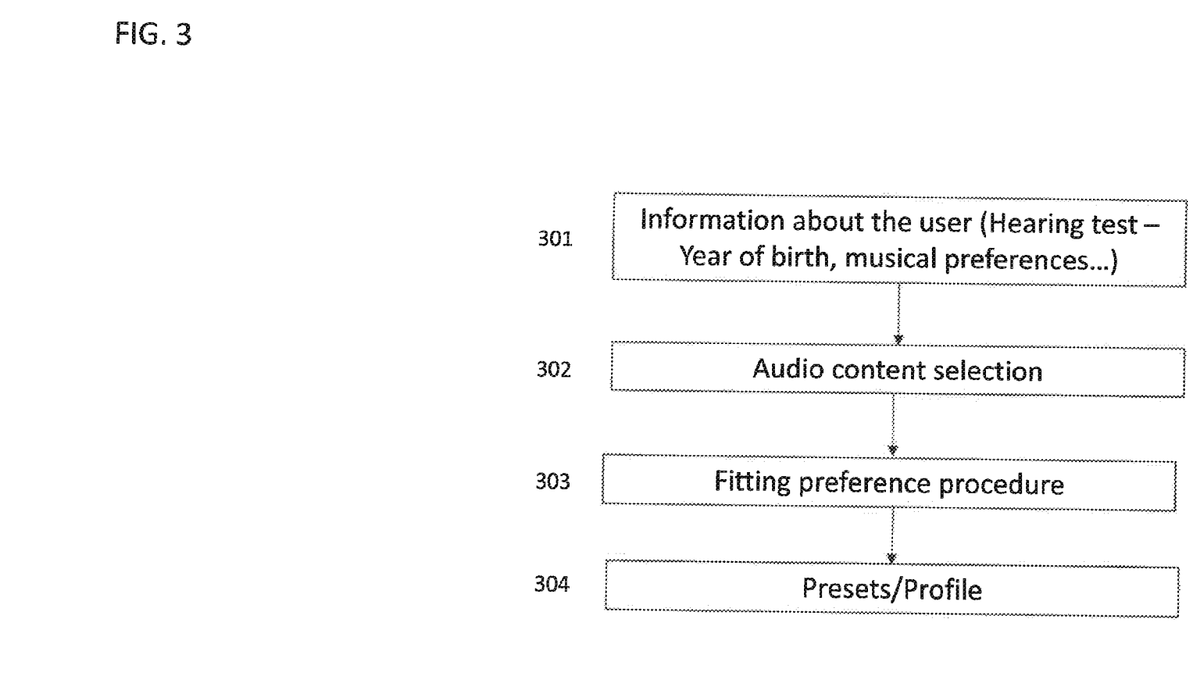
FIG. 3 illustrates how the content selection step may fit in a parameter setting flow based on a user's subjective preference.

FIG. 3 illustrates how the content selection step 302 may fit in a parameter setting user flow based on a user's subjective preference. This parameter setting user flow may take place on a user interface. The parameter setting user flow usually starts with collecting information about the user's hearing ability and personal preferences, in a first step

301. This step may typically take place on the user's device. Information about the user's hearing ability may be collected by making the user take a hearing test, or by matching the user's year of birth to an average hearing ability of users of the same age. Questions relative to how the user likes to enjoy music, the headphones he is using, and his favorite musical genres may be asked.

In a second step 302, the audio content clips that are the most appropriate for the rest of the procedure are selected. The user's preferred musical genre may be selected based on the questions in step 301. The audio content in the user's device is scanned. Candidate segments may be generated from the media corpus and ranked according to their respective signal characteristics. This content selection step 302 may refer to steps 101 to 104 in FIG. 1*a*. This step may also comprise processing the media signals of a subset of the candidate media segments with different signal processings.

In step 303, a fitting preference procedure is conducted. In this step, one or more A/B comparison, a MUSHRA test, or other fitting preference procedures may occur.

An example of fitting preference procedure consists in displaying fitting parameters on a user interface. Parameters such as compression and coloration may for example be displayed on a grid-like format (with e.g., compression on one axis and coloration on the other axis). The selected audio content clip is played, typically in a looped way, and the user may then navigate the grid, and identify his preferred places on the grid, and thus, his preferred parameterization of the audio content.

The use of A/B comparisons is for the user to compare sonic properties between at least two sets of presets for the same audio content clip, and to select the one he prefers.

The use of a MUSHRA (MUltiple Stimuli with Hidden Reference and Anchor) test is a methodology for conducting a listening test to evaluate the perceived quality of the output, e.g. from lossy audio compression algorithms. The test can be used for judging perceived quality of other signal processings, too.

All of these fitting preference procedures may occur once or more, be permutated, added ad hoc, or skipped. In the context of the present invention, at least one fitting preference procedure needs to take place.

In step 304, the selected set of presets will then be applied to the subsequent audio content.

Figure 4:
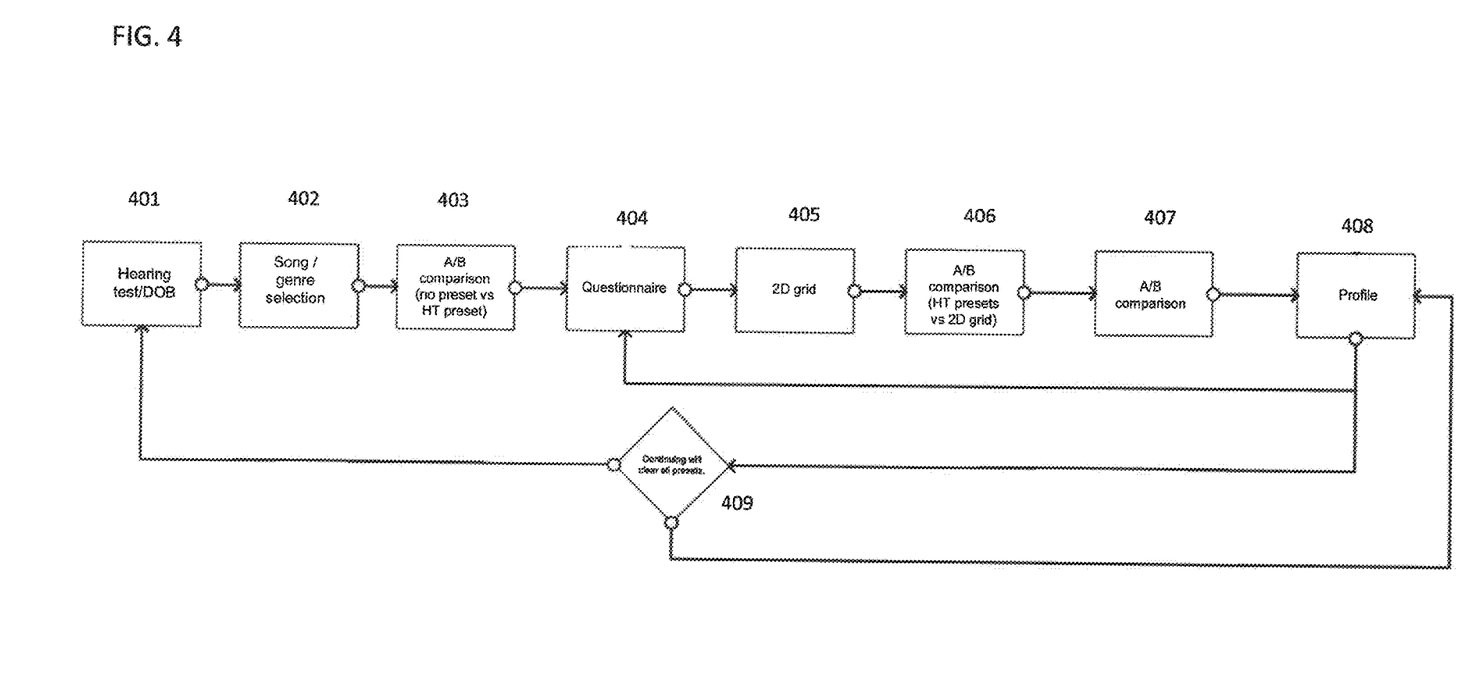
FIG. 4 illustrates a specific example of a fitting preference procedure user flow.

FIG. 4 illustrates a specific example of a fitting preference procedure user flow.

In a first step 401, information about the user's hearing ability is collected. This may be achieved by a user taking a hearing test or entering his date or year of birth (DOB). Information about the user's hearing ability may be used to adapt the processing parameters to the user's specific hearing ability before moving on with the process.

In a next step 402, a genre selection may occur. A musical genre may be selected by the user, or by the device by detecting musical preferences based on the user's habits. The genre selection may be useful to identify the user's preference and increasing the likelihood of presenting content to the user that he is familiar with and would enjoy listening to. Examples of musical genres may be classical music, pop music, rock music, jazz music, etc. It may be assumed that a user will be more careful in the assessment of content in a musical genre that he enjoys or is familiar with.

In a further step 403, an A/B preference test may take place, in which a candidate segment as obtained according to the present invention is presented to the user with processing parameters for users with a normal hearing ability, i.e. no hearing loss) and with processing parameters corresponding to the user's hearing age or hearing ability as determined in step 401. This step 403 is optional and may or may not occur.

In a further step 404, a questionnaire may be presented to the user. This step is used to collect data about the user's habits and preferences. Step 404 is also optional in the process.

In a further step 405, a user interface, for example a 2-dimensional grid is presented to the user. Such an interface may allow to the user to listen to the looped candidate segment and to indicate his preference for certain audio processing presets rather than other, for example by being able to compare audio processed by the presets. Variables such as coloration or compression of the audio content may be used as variables, for example variables displayed on axes of a grid. The point on the 2-dimensional grid that the user prefers matches a set of processing parameters (compression threshold and ratio).

In further steps 406 and 407, the user is submitted to one or more A/B tests to compare different sets of processing parameters, e.g. the parameters derived from the user's hearing ability (step 401) and from the 2-dimensional grid (step 405). These steps may be repeated.

In step 408, a user profile is created, comprising the preferred processing parameters derived from the previous steps of preference testing.

Steps 405, 406 and 407 may be interchangeable and may be repeated a certain number of times, more repetitions may increase the accuracy of the results.

There is also the option for the user to clear the processing parameters in a step 409, that will restart the process, with the option to retake a new hearing test.

FIG. 5 illustrates an exemplified MUSHRA testing procedure. MUltiple Stimuli with Hidden Reference and Anchor is a methodology typically applied for conducting a codec listening test to evaluate the perceived quality of the output from lossy audio compression algorithms. The test can be used for judging perceived quality of signals processed with other methods. In a MUSHRA test, users are presented with an open reference stimulus (or more generally, audio content) and a number of test stimuli (conditions). The conditions contain the hidden reference stimulus, at least two anchor stimuli (low quality anchor and mid quality anchor) and stimuli which were processed by the systems under test. When assessing the conditions, the users are allowed to switch instantaneously between conditions and the open reference while listening. In FIG. 5, a reference audio content is played, and submitted to the user, who will compare the reference audio content to the A, B, C, D, E, F, G and H samples of the same audio content as the reference, but with differing presets. The user will evaluate the sonic properties of the respective contents compared to the reference, by moving the slider up (better sonic properties than the reference audio content), down (worse sonic properties than the reference audio content) or leave it in the middle (same sonic properties than the reference audio content).

Figure 6:
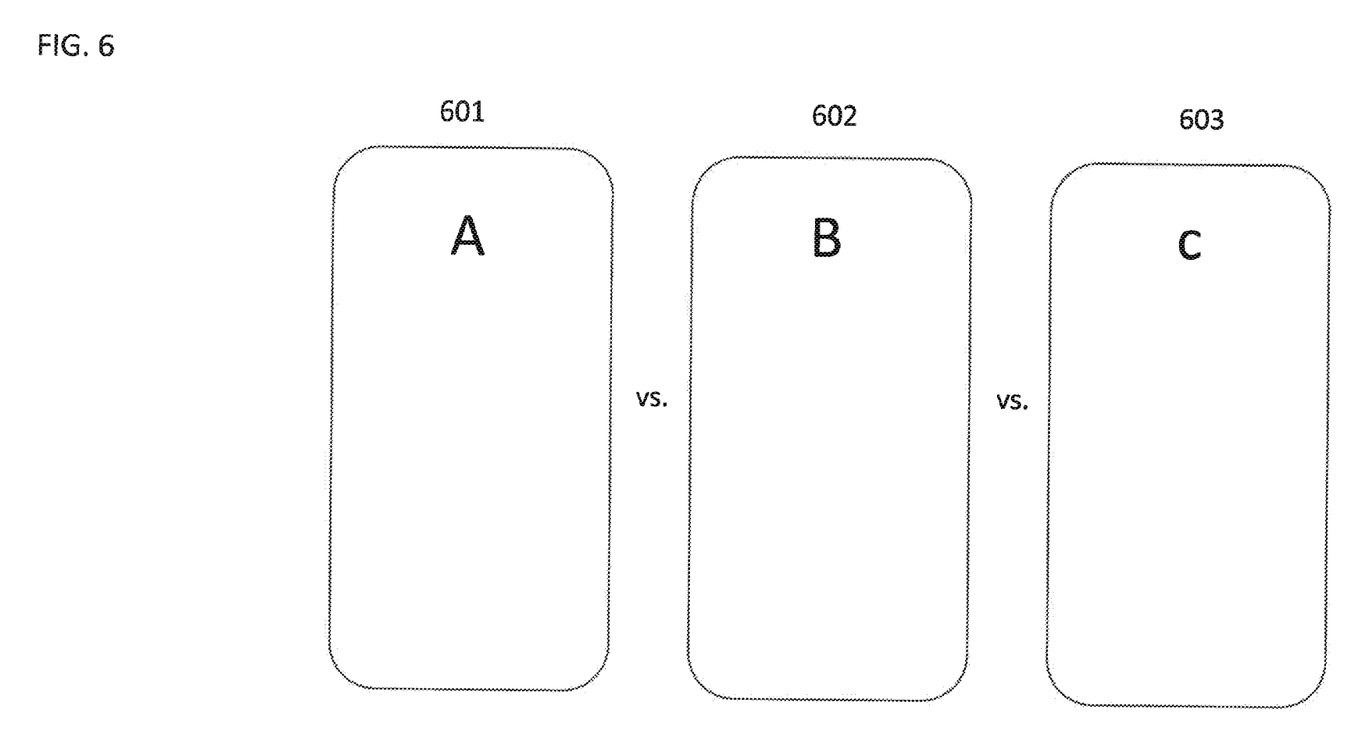
FIG. 6 illustrates an A/B/C comparison procedure.

FIG. 6 illustrates an A/B comparison procedure. Generally, A/B comparisons may be used with as many different presets as it is necessary, for a user to assess the different presets on the same audio content clip, and to selected his preferred set of presets. An audio content clip is used, with different presets, in the case of FIG. 6, three different sets of presets may be used. The audio content clip with presets A (601) may be compared with the audio content clip with presets B (602) and with the audio content clip with presets C (603). The user listens and assesses the audio content clips 601, 602 and 603 and selects his preferred set of parameterized audio content.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be noted that the apparatus (device) features described above correspond to respective method features that may however not be explicitly described, for reasons of conciseness. The disclosure of the present document is considered to extend also to such method features. In particular, the present disclosure is understood to relate to methods of operating the devices described above, and/or to providing and/or arranging respective elements of these devices.

It should also to be noted that the disclosed example embodiments can be implemented in many ways using hardware and/or software configurations. For example, the disclosed embodiments may be implemented using dedicated hardware and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of this disclosure.

It should further be noted that the description and drawings merely illustrate the principles of the present disclosure. Those skilled in the art will be able to implement various arrangements that, although not explicitly described or shown herein, embody the principles of the present disclosure and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the present disclosure, as well as specific examples thereof, are intended to encompass equivalents thereof

The invention claimed is:

1. A method for processing media content, the method comprising:
  receiving a definition of a user specific media corpus, the user specific media corpus comprising a plurality of media files;
  ranking candidate media segments generated from the user specific media corpus according to one or more signal characteristics derived from the candidate media segments;
  processing one or more media signals of a subset of the ranked candidate media segments with different signal processings;
  presenting the processed one or more media signals for a user preference judgment; and
  determining a preferred signal processing of the different signal processings based on the user preference judgment.

2. The method of claim 1, wherein the candidate media segments are generated by a chunking algorithm that partitions the plurality of media files into segments, the candidate media segments having a length between a minimum segment duration and a maximum segment duration.

3. The method of claim 1, wherein the candidate media segments are generated by a looping algorithm that identifies segments meeting a minimum loop quality criterion.

4. The method of claim 1, wherein an error score is generated for a candidate media segment from a first signal characteristic of the one or more signal characteristics.

5. The method of claim 4, wherein the ranking is based on a weighted combination of the error score of the first signal characteristic and an error score of a second signal characteristic of the one or more signal characteristics.

6. The method of claim 5, wherein weights for the weighted combination are determined by a machine learning algorithm.

7. The method of claim 6, wherein at least a second user preference judgment is received, and an error term is generated representing consistency in the user preference judgments, the error term used for the machine learning algorithm.

8. The method of claim 4, wherein deriving the one or more signal characteristics results in an index score, the error score representing how well the index score matches a target index score.

9. The method of claim 1, wherein the one or more signal characteristics comprise one of: a spectral centroid, a loop quality index, a spectral flux, and a zero-crossing rate.

10. The method of claim 1, wherein the subset of the candidate media segments is determined from a best-ranked candidate media segments by selecting a top N candidates or by applying a threshold value.

11. The method of claim 1, wherein the definition of the user specific media corpus refers to a content database on a media server or on a consumer device.

12. The method of claim 1, wherein the plurality of media files are audio clips in a music library.

13. The method of claim 1, wherein the definition of the user specific media corpus comprises a playlist received from a consumer device.

14. The method of claim 1, wherein the definition of the user specific media corpus comprises identification of a genre, the method further comprising identifying the user specific media corpus comprising a plurality of media files corresponding to the genre.

15. The method of claim 1, wherein the different signal processings is either different signal processing algorithms or different configurations of one signal processing algorithm.

16. The method of claim 1, wherein presenting the processed one or more media signals for the user preference judgment comprises playing the processed one or more media signals and prompting for input based on the playing.

17. The method of claim 1, wherein determining the preferred signal processing of the different signal processings based on the user preference judgment comprises determining a preference score for each of the different signal processings based on the user preference judgments.

18. The method of claim 1, wherein determining the preferred signal processing of the different signal processings based on the user preference judgment comprises determining preferred configuration parameters of an applied signal processing algorithm.

19. The method of claim 1, wherein an identification of the preferred signal processing is communicated to a consumer device associated for application to media content.

20. An apparatus comprising:
   at least one processor; and
   at least one memory storing instructions, which when executed by the at least one processor, causes the at least one processor to:
      receive a definition of a user specific media corpus, the user specific media corpus comprising a plurality of media files;
      rank candidate media segments generated from the user specific media corpus according to one or more signal characteristics derived from the candidate media segments;
      process one or more media signals of a subset of the ranked candidate media segments with different signal processings;
      present the processed one or more media signals for a user preference judgment; and
      determine a preferred signal processing of the different signal processings based on the user preference judgment.

21. At least one non-transitory computer-readable medium storing instructions, which when executed by at least one processor, causes the at least one processor to:
   receive a definition of a user specific media corpus, the user specific media corpus comprising a plurality of media files;
   rank candidate media segments generated from the user specific media corpus according to one or more signal characteristics derived from the candidate media segments;
   process one or more media signals of a subset of the ranked candidate media segments with different signal processings;
   present the processed one or more media signals for a user preference judgment; and
   determine a preferred signal processing of the different signal processings based on the user preference judgment.

* * * * *